United States Patent
Bergey et al.

(10) Patent No.: US 10,027,917 B2
(45) Date of Patent: Jul. 17, 2018

(54) IN-PIXEL CORRELATED DOUBLE SAMPLING WITH FOLD-OVER DETECTION

(71) Applicant: Forza Silicon Corporation, Pasadena, CA (US)

(72) Inventors: Jonathan Bergey, Kennett Square, PA (US); Sam Bagwell, Glendale, CA (US)

(73) Assignee: Forza Silicon Corporation, Pasadena, CA (US)

( * ) Notice: Subject to any disclaimer, the term of this patent is extended or adjusted under 35 U.S.C. 154(b) by 0 days.

(21) Appl. No.: 14/875,595

(22) Filed: Oct. 5, 2015

(65) Prior Publication Data

US 2016/0100114 A1   Apr. 7, 2016

Related U.S. Application Data

(60) Provisional application No. 62/060,108, filed on Oct. 6, 2014.

(51) Int. Cl.
*H04N 5/378* (2011.01)
*H04N 5/357* (2011.01)
*H04N 5/3745* (2011.01)

(52) U.S. Cl.
CPC ........... *H04N 5/378* (2013.01); *H04N 5/3575* (2013.01); *H04N 5/37452* (2013.01)

(58) Field of Classification Search
CPC ..... H04N 5/378; H04N 5/3745; H04N 5/3698
USPC ........................................................ 348/250
See application file for complete search history.

(56) References Cited

U.S. PATENT DOCUMENTS

| | | | | |
|---|---|---|---|---|
| 4,719,512 A | * | 1/1988 | Endo | .................... H04N 5/2173 348/250 |
| 9,172,873 B2 | * | 10/2015 | Yang | ................... H04N 5/23241 |
| 2003/0133627 A1 | * | 7/2003 | Brehmer | ................ H04N 5/243 382/308 |
| 2014/0016027 A1 | * | 1/2014 | Yang | .................. H04N 5/23241 348/372 |
| 2014/0027639 A1 | * | 1/2014 | Yang | ........................ H03F 3/087 250/338.1 |
| 2014/0027640 A1 | * | 1/2014 | Yang | ................. H01L 27/14609 250/338.4 |
| 2016/0100114 A1 | * | 4/2016 | Bergey | ................. H04N 5/3575 348/250 |

* cited by examiner

*Primary Examiner* — Antoinette Spinks

(57) ABSTRACT

Disclosed herein are improved in-pixel correlated double sampling elements for photodetectors. The novel circuits and associated methods of the invention allow for accurate correlated double sampling while avoiding the inherent sampling errors that may occur in prior art in-pixel correlated double sampling techniques when bright or saturating signals are received.

12 Claims, 4 Drawing Sheets

IN-PIXEL CORRELATED DOUBLE SAMPLING WITH FOLD-OVER DETECTION

CROSS-REFERENCE TO RELATED APPLICATIONS

This application claims the benefit of priority to U.S. Provisional Application Ser. No. 62/060,108, entitled "In-Pixel Correlated Double Sampling with Fold-over Detection," filed Oct. 6, 2014, the contents of which are hereby incorporated by reference.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not Applicable.

BACKGROUND OF THE INVENTION

The use of correlated double sampling (CDS) is advantageous in Infrared Readout Integrated Circuits (IR ROIC), and other image sensor types. In short, CDS is the subtraction of inherent pixel noise from the measured signal. This can be achieved by separately reading out the reset level (signal present in a pixel when substantially no charge has been integrated) and the measurement signal (the signal generated by integration of photon-driven charge). However, separate readout of the two signals creates complicated readout schemes and issues with power consumption, noise, and limited bandwidth.

Accordingly, in-pixel CDS circuits and methods have been developed to implement CDS at the pixel level, such that only a single read of the corrected pixel signal is necessary. For example, in-pixel CDS circuits are disclosed in pending United States Patent Application Publication Number 20140016027, entitled "CTIA In-Pixel Correlated Double Sampling with Snapshot Operation for IR Readout Integrated Circuits," filed May 31, 2013, the contents of which are hereby incorporated by reference in their entirety.

FIG. 1 depicts a prior art circuit configured for in-pixel CDS. The circuit is connected to a photodetector 101, e.g. an infrared photodetector. Current flows from the IR detector element as photons are received. The current output is accumulated as charge on the capacitor 104 of a charge transimpedance amplifier 103. A feedback loop across capacitor 104 is present, which stores photointegrated signal on the capacitor during the read phase. The output of the buffer amplifier is thus a voltage representative of the amount of current that has been integrated. The amplifier is connected in series with pixel output circuitry across a CDS capacitor 106, such that the output side of the circuit is AC-coupled to the input side of the circuit. The amplifier output voltage is read across the capacitor by a source follower 110 that connects to pixel output components, for example a snapshot switch 111, storage capacitor 112, and an additional source follower amplifier 113.

During the reset phase, the reset switch 105 in the amplifier feedback loop is closed, shorting the capacitor and causing the amplifier reset level signal to be output by the amplifier. Meanwhile, switch 109 is closed, applying a bias voltage to the output side of the CDS capacitor. The reset signal becomes stored on the CDS capacitor. Switch 105 is released at the end of the reset phase, causing a transient disturbance of the amplifier, which settles within a matter of nanoseconds. Switch 109 is released after a settling interval, e.g. 10-100 ns after the reset switch is opened. The time period between release of the reset switch and the release of the voltage clamping switch will be referred to herein as the "clearance interval."

Thereafter, the integration period begins again, during which time the voltage signal representing the integration of charge by the IR detection unit is output by the CTIA. Integration causes a voltage swing in the output of the CTIA, such voltage swing being read across the CDS Capacitor in opposition to the stored reset signal. The resulting final signal across the CDS capacitor at the end of the integration period is thus the differential between the integration signal and the previously stored reset signal. Accordingly, the resulting output signal (read by a source follower voltage buffer, for example) is a corrected integration signal from which reset signal has effectively been subtracted.

The CDS scheme outlined above advantageously eliminates noise. However, due to the timing of the operations, the potential for a lost signal or "fold-over" error artifact exists. During the clearance interval, current from the IR detector causes charge to accumulate on the CTIA capacitor and a voltage signal is output by the CTIA to the CDS capacitor. Because the clamping switch is still closed during the clearance interval, this integration does not get coupled through to the output side of the CDS capacitor. The CDS capacitor is effectively off-line during the clearance interval, and the signal representing photon-generated current from the photodetector is lost, this signal referred to as "lost signal" herein. Once the clamping switch is released at the end of the clearance interval, integrated charge results in a voltage signal that is accumulated across the CDS capacitor and is not lost. However, in the case of a bright input stimulus, the lost signal is non-negligible, creating an under-measurement error. In the event of an extremely bright stimulus, the CTIA can saturate before the clamping switch is released, such that no signal is recorded during the subsequent integration period, when a signal corresponding to a bright stimulus should have been recorded. Thus, the signal can be said to have "folded-over."

A foldover event is depicted in FIG. 2., which is an idealized plot of signal strength vs. input signal level in a photodetector. As input signal increases, the reference voltage (line 204) signal increases. Pixel signal (line 202) increases as well, until the pixel becomes saturated. In an in-pixel CDS scheme, where output signal (line 202) is the difference between pixel signal and reference signal, the output signal begins to decline after pixel saturation, this decline in signal being a foldover (203).

Accordingly, there is a need in the art to improve in-pixel CDS techniques by adding the ability to record lost signal, and to detect and correct for foldover events.

SUMMARY OF THE INVENTION

The inventions disclosed herein are directed to detecting the occurrence of substantial lost signal and/or a fold-over event, and correcting the pixel output signal such that it corresponds to the actual photon energy received rather than an under-measurement. Circuits and associated methods which detect and correct for foldover events are presented herein.

DETAILED DESCRIPTION OF THE INVENTION

The scope of the invention encompasses any circuitry which collects photointegration signal during and acts upon the output signal in response to such signal or in response to transient or cumulative signals that exceeds a predetermined threshold. For example, the invention encompasses circuits designed to record signal during pixel CDS operations or pixel saturation events.

Figure 1:
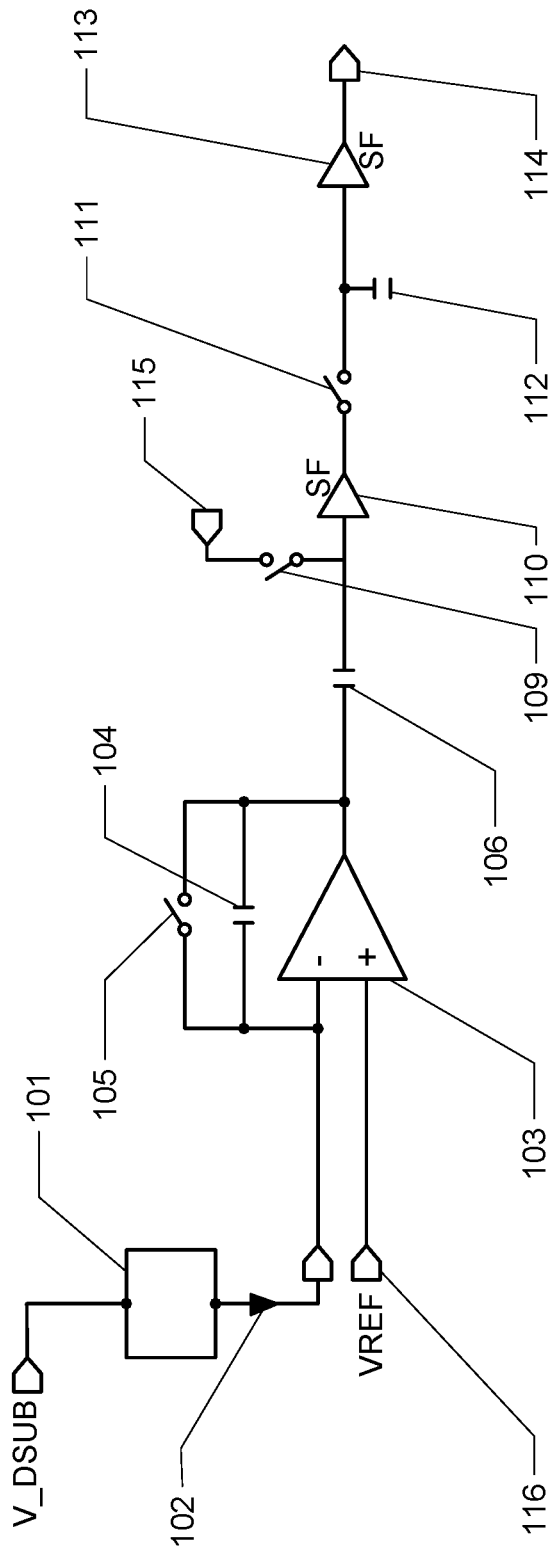
FIG. 1 depicts a prior art in-pixel CDS readout circuit for an IR ROIC.
Figure 2:
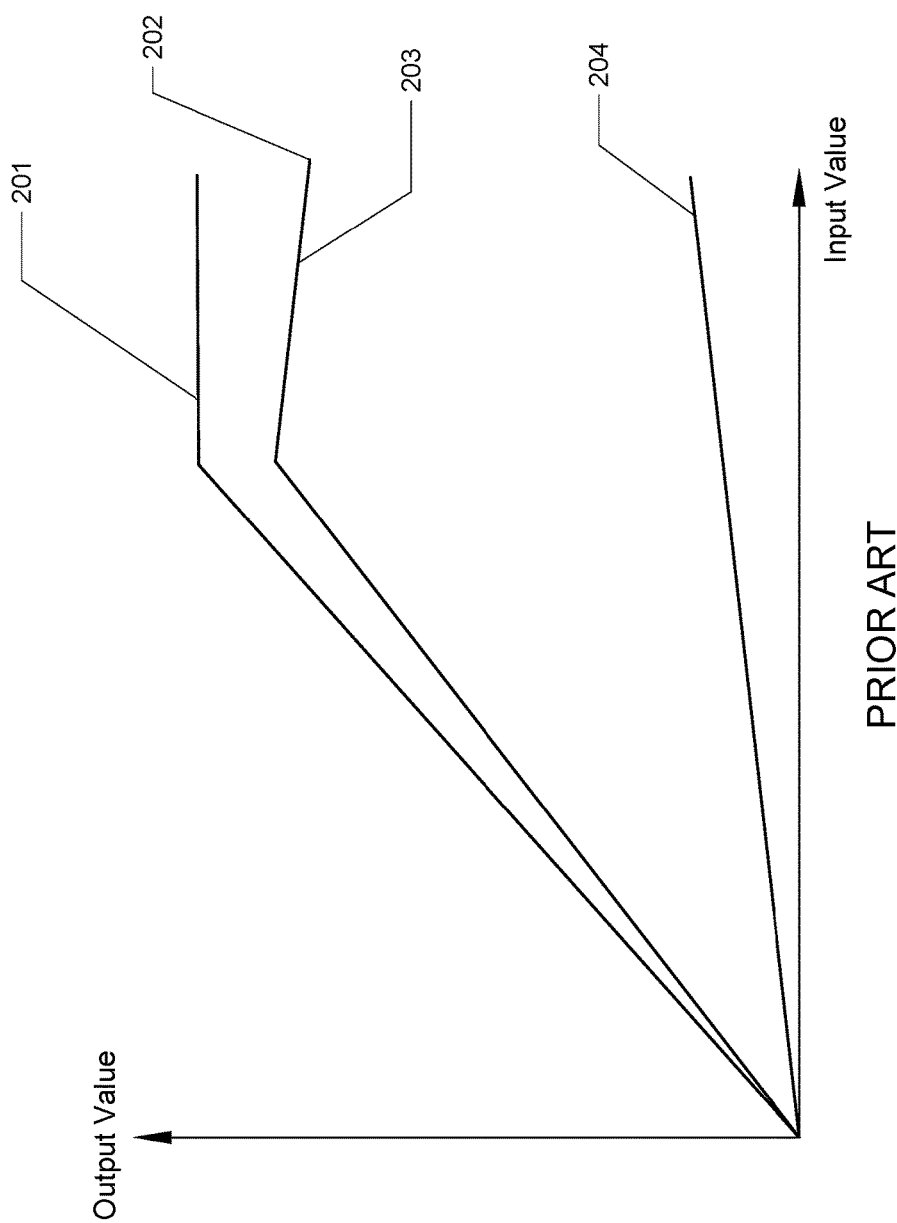
FIG. 2 depicts an idealized signal vs. input signal strength plot.
Figure 3:
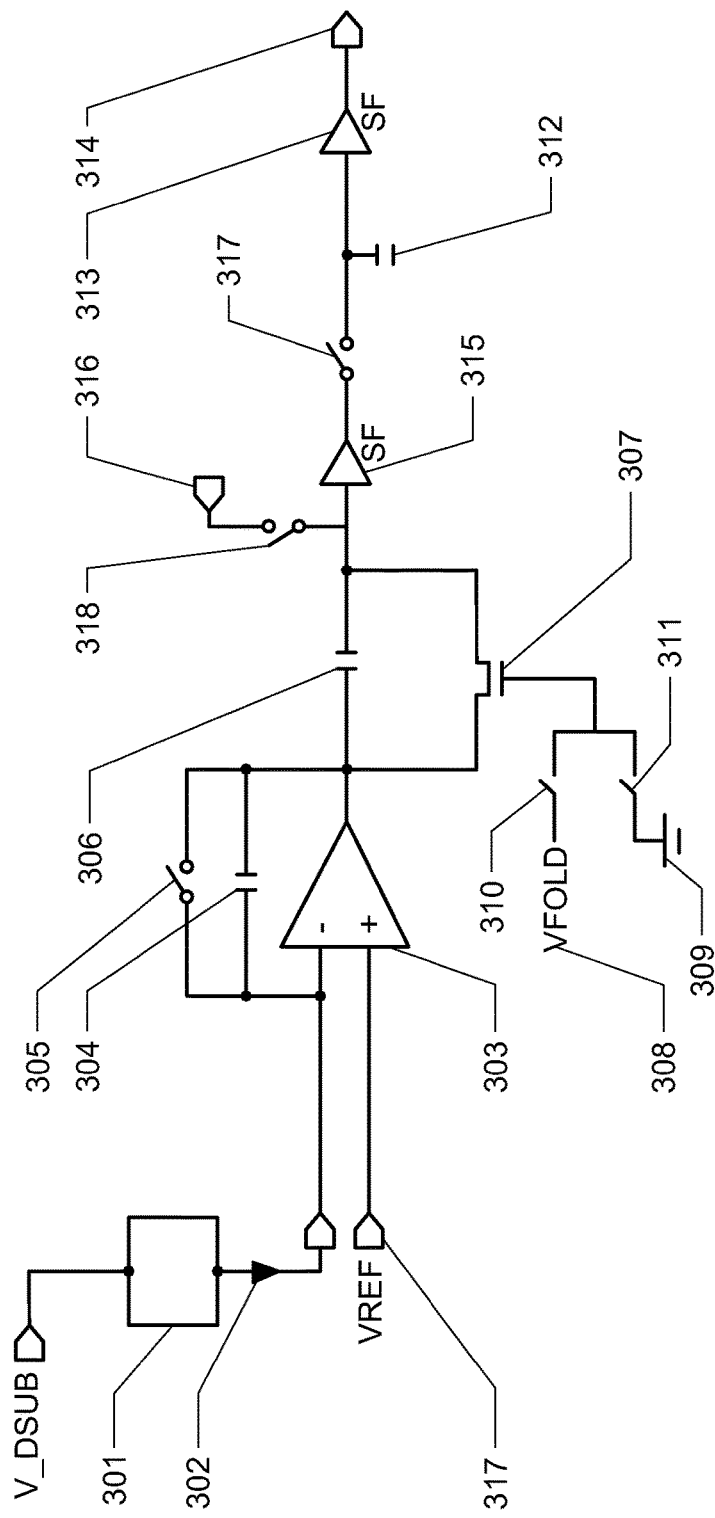
FIG. 3 depicts an exemplary IR ROIC of the invention, having foldover protection capabilities.

An exemplary fold-over protection circuit is depicted in FIG. 3. As in the configuration depicted in FIG. 1., the circuit of FIG. 3 is an IR ROIC. The circuit is connected to a photodetector 301, e.g. an infrared photodetector. Current 302 flows from the IR detector element as photons are received. The current output is accumulated as charge on the capacitor 304 of a charge transimpedance amplifier 303. A feedback loop across capacitor 304 is present, which stores photointegrated signal on the capacitor during the read phase. The output of the buffer amplifier is thus a voltage representative of the amount of current that has been integrated. The amplifier is connected in series with pixel output circuitry across a CDS capacitor 306, such that the output side of the circuit is AC-coupled to the input side of the circuit. The amplifier output voltage is read across the capacitor by a source follower 315 that connects to pixel output components, for example a snapshot switch 317, storage capacitor 312, and an additional source follower amplifier 313.

The exemplary circuit of FIG. 3 includes a lost signal or foldover detection circuit. The lost signal or fold-over detection element comprises a gated connection between the CTIA output (on the input side of the CDS capacitor) and the output line (on the output side of the CDS capacitor), in parallel with the CDS capacitor. The gate 307 may comprise a transistor, for example an NMOS transistor biased at a carefully selected voltage such that it will begin conducting only when a significant signal is output by the CTIA. The significant signal threshold at which conductance through the gate occurs may correspond to a bright input to the photodetector, or may correspond to the saturation of the CTIA capacitor. The conducted current is accumulated as charge on the output side of the CDS capacitor, such that output signal from the CTIA is registered and is not lost. The biasing voltage from a voltage source (308) can be adjusted such that saturation of the CTIA results in driving a sufficiently low voltage across the CDS capacitor to create a distinct saturation signal (distinguishable from a bright signal).

The gate may be taken offline, by driving it to ground, during the clearance interval (i.e. the time interval between when the Reset switch has been released and the Clamp switch is still closed). This can be accomplished by opening switch 310, breaking the connection between the gate and the bias voltage source 308 and closing switch 311 to connect the gate to ground 309. This is done to prevent the case in which, under extremely bright signal, the CTIA saturates before the Clamp switch is opened. If the Fold Over device was not turned off in this case, it would conduct while the clamp switch was closed, and both the pixel CTIA and Clamp voltage source would be trying to drive the node simultaneously. To prevent this situation, the gate may driven to ground until the Clamp switch is released, at which point it is driven to bias voltage.

In one implementation, the invention comprises a circuit comprising a capacitor, the first plate of the capacitor being connected to the output of a first amplifier, for example a charge transimpedance amplifier, and the second plate of the capacitor being connected to an output element. The output element may comprise, for example a second amplifier, for example, a source follower amplifier. The output element may comprise a sample and hold capacitor, or it may comprise an output line which connects to storage or processing elements. The output of the first amplifier is thus AC-coupled across the capacitor to the output element. The circuit further comprises a gated connection between the output of the amplifier and the second plate of the capacitor. The gate may comprise any gate known in the art, for example a transistor, for example, an NMOS transistor. A biasing voltage source may be connected to the gate in order to modulate the conductance of the gate. The biasing voltage is tuned such that only signal which exceeds a certain threshold is conducted from the amplifier output to the second plate of the capacitor. For example, the selected signal level at which the gate conducts may be a signal corresponding to a very bright illumination of the photodetector or saturation of the CTIA. In one implementation, the circuit further comprises a connection between the second plate of the capacitor and a voltage source, for example a clamping voltage source. A switch connects or disconnects the second plate of the capacitor from the voltage source.

In another embodiment, a switch may connect or disconnect the biasing voltage to the gate. In another embodiment, a switch may connect or disconnect the gate to a ground.

In its broadest scope, the invention encompasses any readout circuit for a sensor wherein a gated connection bridges the two sides of a signal-storing capacitor, such that signal will be routed from the input side of the capacitor to the output side of the capacitor when signal strength exceeds a specific threshold. The invention may be implemented as the exemplary readout circuit of FIG. 3, or may encompass alternative configurations comprising the gated signal overflow element described herein.

The correlated double sampling elements with foldover detection of the invention may be implemented in any sensor readout circuit or device, for example as an in-pixel CDS element in pixels of a photodetector, including IR-sensing pixels (including IR-ROIC that can operate in snapshot mode), visible light sensing pixels, and other types.

The scope of the invention further encompasses methods of operating in-pixel CDS and like operations. In one embodiment, the invention comprises a method of operating a pixel having in-pixel CDS elements, for example as depicted in FIG. 3. The pixel is operated in three phases. In the first phase, the read phase, the CTIA integrates signal from the photodetector and the resulting CTIA output is stored across the CDS capacitor, where it may be read, stored or processed by processing elements, such as a source follower amplifier. During this read phase, signal may be conducted to the output side of the CDS capacitor if CTIA output signals exceed a selected threshold, for example a threshold corresponding with the signal level of a bright signal or a CTIA-saturating signal. In such event, this signal recorded on the CDS capacitor.

The readout circuit is next operated in a second step, the reset step, wherein the CTIA capacitor is shorted and the clamping voltage is applied to the CDS capacitor. This is followed by a third phase, the clearance step. In this step, the CTIA reset switch is opened, and then after a short interval, e.g. 1-1,000 ns, for example 10-100 ns, the clamping voltage switch is opened. The pixel reset level is now stored on the CDS capacitor and the read step can be repeated.

Example 1

Figure 4:
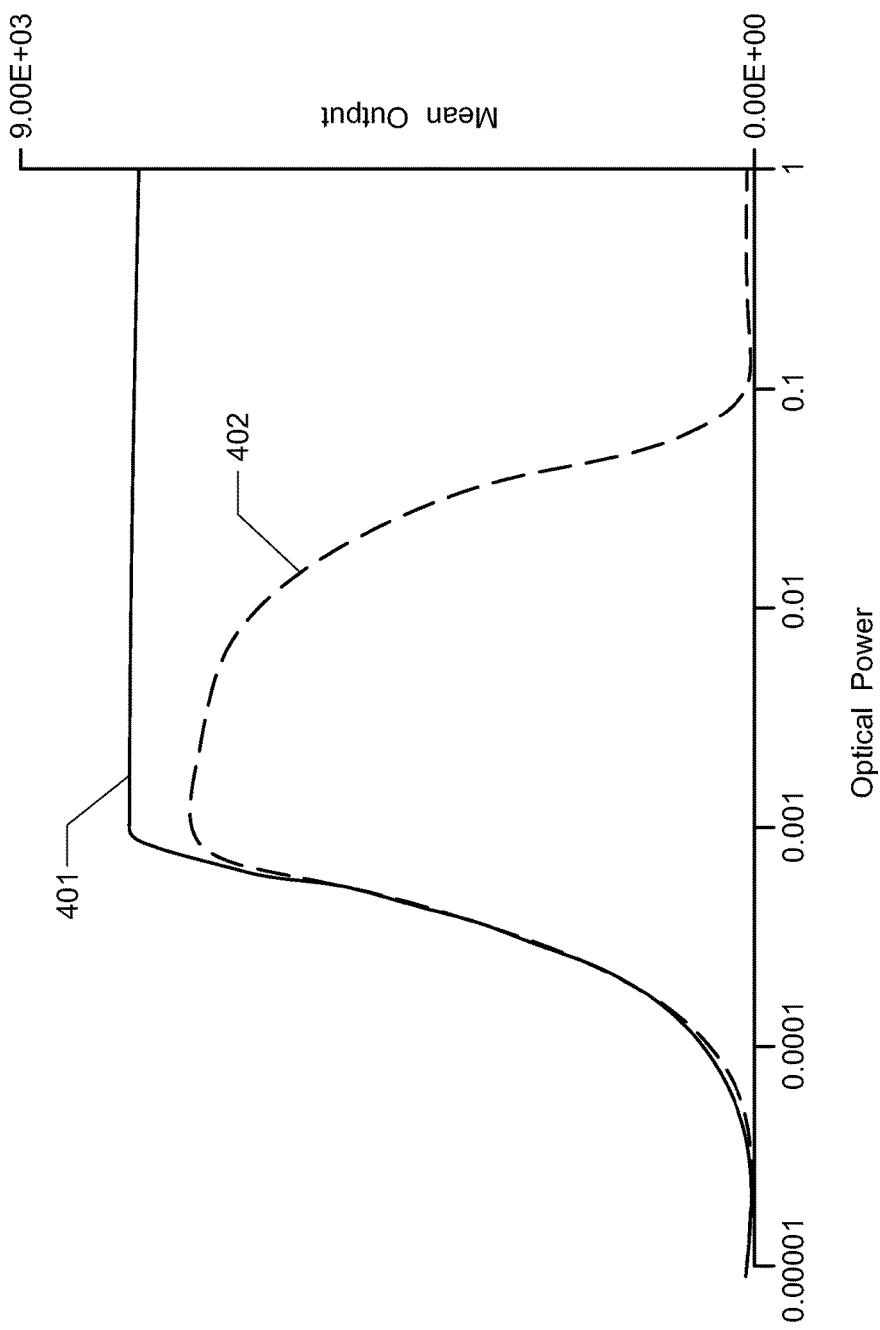
FIG. 4 is a test plot of signal strength vs. input signal strength, generated in an experimental simulation of the invention.

The foldover detection technique of the invention was tested in a simulated image sensor having the foldover protection circuit implemented as shown in FIG. 3. The test chip had the ability to control the voltage at the gate of the foldover clamp transistor. It also had the ability to disable the foldover clamp transistor, effectively removing the foldover protection functionality. A simulation was performed wherein the pixel sensor array was stimulated with uniform illumination of increasing optical intensity. Mean pixel response from the array was determined at each intensity step. The results are presented in FIG. 4, with the optical intensity (power) on the x-axis with arbitrary units, while the y-axis shows the average pixel response from the array. This measurement was performed with foldover protection enabled (line 401) and disabled (line 402). From the measurement, it is shown that without the protection enabled, the average pixel value starts to decrease when the optical input gets too large (i.e. it is folding over), while the average pixel value 'saturates' and does not decrease when the protection is enabled.

All patents, patent applications, and publications cited in this specification are herein incorporated by reference to the same extent as if each independent patent application, or publication was specifically and individually indicated to be incorporated by reference. The disclosed embodiments are presented for purposes of illustration and not limitation. While the invention has been described with reference to the described embodiments thereof, it will be appreciated by those of skill in the art that modifications can be made to the structure and elements of the invention without departing from the spirit and scope of the invention as a whole.

The invention claimed is:

1. A readout circuit for a photodetector, comprising
a first amplifier, the amplifier comprising an input from which signals are received from a photodetector and further comprising an output;
a capacitor, having a first plate connected to an input line and a second plate connected to an output line, the input line being connected to the output of the first amplifier and the output line being connected to an output element selected from the group consisting of a second amplifier, a second capacitor, or a pixel output line;
a voltage source which, via a connection comprising a switch, applies a bias voltage to the output line when the switch is closed; and
a connection between the input line and the output line, such connection being controlled by a gate; the gate conductance being such that it will conduct only when the amplifier output exceeds a selected level.

2. The readout circuit of claim 1, wherein
the amplifier is a charge transimpendance amplifier.

3. The readout circuit of claim 1, wherein
the photodetector is an infrared photodetector.

4. The readout circuit of claim 1, wherein
the output element is a source follower amplifier.

5. The readout circuit of claim 1, wherein
the gate is an NMOS transistor.

6. The readout circuit of claim 1,
wherein a biasing voltage is applied to the gate by a connection to a voltage source.

7. The readout circuit of claim 6, wherein
the voltage source may be connected or disconnected from the gate by means of a switch.

8. The readout circuit of claim 1, comprising a connection between the gate and ground, wherein the gate be may be connected or disconnected to ground by means of a switch.

9. The readout circuit of claim 1, wherein
the selected signal strength at which the gate will conduct is that which corresponds with saturation of the photodetector.

10. A method of operating a readout circuit for a photodetector,
wherein the readout circuit comprises a first amplifier, the first amplifier comprising a charge transimpedance amplifier comprising a feedback capacitor, the first amplifier further comprising an input which receives signal from a photodetector and an output; a capacitor, having a first plate and a second plate, the first plate being connected to the output of the amplifier and the second plate being connected to an output element selected from the group consisting of a second amplifier, a signal storage capacitor, or a pixel output line; a first voltage source which, via a connection comprising a biasing voltage switch, applies a bias voltage to the second plate of the capacitor when the switch is closed; and a connection between the first plate of the capacitor and the second plate of the second capacitor, such connection being controlled by a gate; the gate conductance being such that it will conduct only when the amplifier output exceeds a selected level;
wherein the readout circuit is operated in a repeating series of steps, the series of steps comprising a readout step, a reset step, and a clearance step;
wherein, during the readout step, signal from the photodetector is integrated by the first amplifier across the feedback capacitor and the output of the amplifier is AC-coupled to the output element; and wherein if the signal output from the amplifier exceeds the selected threshold, signal will conduct through the gated connection from the first amplifier output to the second plate of the capacitor;
wherein, during the reset step, the two plates of the feedback capacitor are shorted together by a reset switch and the first voltage source is connected to the second plate of the capacitor by closing the bias voltage switch; and
wherein, during the clearance step, the reset switch is opened and then the bias voltage switch is opened after a period of 10-100 ns.

11. The method of claim 10, wherein
a biasing voltage is applied to the gate by a second voltage source during the read and reset steps.

12. The method of claim 11, wherein
during the clearance step, the gate is disconnected from the second voltage source and is connected to ground.

* * * * *